United States Patent
Staber et al.

(10) Patent No.: US 6,996,232 B1
(45) Date of Patent: *Feb. 7, 2006

(54) XDSL SPLITTER LINE MODULE FOR NETWORK INTERFACE DEVICE

(75) Inventors: Harley J. Staber, Coppell, TX (US); Chanh Vo, Bedford, TX (US); John J. Napiorkowski, Irving, TX (US)

(73) Assignee: Corning Cable Systems LLC

( * ) Notice: Subject to any disclaimer, the term of this patent is extended or adjusted under 35 U.S.C. 154(b) by 0 days.

This patent is subject to a terminal disclaimer.

(21) Appl. No.: 09/001,565

(22) Filed: Dec. 31, 1997

(51) Int. Cl.
*H04M 9/00* (2006.01)

(52) U.S. Cl. .............................. 379/413.02; 379/413.04
(58) Field of Classification Search .............. 379/399, 379/93.06, 397, 413.02, 413.04, 399.01
See application file for complete search history.

(56) References Cited

U.S. PATENT DOCUMENTS

| | | | |
|---|---|---|---|
| 4,910,770 A | * | 3/1990 | Collins et al. .............. 379/399 |
| 5,408,260 A | | 4/1995 | Arnon ............................ 348/6 |
| 5,440,335 A | | 8/1995 | Beveridge ..................... 348/13 |
| 5,469,495 A | | 11/1995 | Beveridge ..................... 379/56 |
| 5,548,641 A | * | 8/1996 | Butler et al. ................ 379/399 |
| 5,757,803 A | * | 5/1998 | Russell et al. .............. 370/494 |
| 5,974,139 A | | 10/1999 | McNamara et al. ........ 379/399 |
| 6,026,160 A | * | 2/2000 | Staber et al. .......... 379/413.03 |
| 6,137,866 A | * | 10/2000 | Staber et al. ............ 379/93.06 |

FOREIGN PATENT DOCUMENTS

WO    WO98/59482    6/1997

OTHER PUBLICATIONS

A1000 ADSL Remote Splitter (LPFR) Installation (with Guidelines for In-home Wiring); Alcatel Telecom; A9693; 3EC 15158 AAAA TCZZA-Ed. 01.

* cited by examiner

Primary Examiner—Jefferey Harold

(57) ABSTRACT

An xDSL splitter module is provided for mounting in a network interface device (NID) that contains an xDSL splitter circuit and the terminals to connect the circuit between outside plant wires and two pairs of inside wires to deliver POTS and xDSL to the subscriber. The module also has at least a demarcation point for the POTS signal.

15 Claims, 5 Drawing Sheets

XDSL SPLITTER LINE MODULE FOR NETWORK INTERFACE DEVICE

FIELD OF THE INVENTION

The present invention relates to a module that is removably installable in a network interface device (NID) and that contains an xDSL splitter circuit for connection between an outside plant wire pair and two inside wiring pairs.

BACKGROUND OF THE INVENTION

ADSL (Asymmetric Digital Subscriber Line) is a modem technology that transmits multimedia and high speed data over existing twisted-pair telephones lines concurrently with Plain Old Telephone Service (POTS) signals. VDSL is a higher speed variation of ADSL. The multimedia and high speed data are at a higher frequency than the POTS signals, and components have been developed that can split the higher frequency multimedia and/or data from the lower frequency POTS signal at either end of the transmission path. IDSL is a variation wherein the multimedia and/or high speed data is transmitted concurrently with an ISDN signal instead of the POTS signal. The ISDN, while a higher frequency than the POTS signal, is lower than the multimedia or high speed data signal. Other variations may exist or be developed where signals of differing frequencies are transmitted over existing twisted-pair wiring to a subscriber. The term xDSL will be used herein to generically refer to these different versions of transmitting higher frequency signals (e.g. ADSL, VDSL) over twisted pair concurrently with a relatively lower frequency signal (e.g., POTS, ISDN, or out-of-band signaling used in special services). The terms "first signal" and "second signal" will be used herein to generically refer to at least two different frequency signals transmitted concurrently over twisted-pair wiring and that are intended to be separated, or split, at the subscriber. The term "combined signals" will be used to refer to both the first and second signals combined over a line.

An xDSL architecture connects an xDSL modem on each end of a twisted-pair telephone line, that is, at the "central office" (or node or remote terminal) and at the premises of the subscriber (or customer). The terms "splitting" or "splitter" are used to refer to a circuit or component, for example, a low pass filter or low pass and high pass filter combination, that separates a first signal from a combined signal in the example of a low pass filter and separates both the first and second signals from the combined signal in the example of the low pass and high pass filter combination. Components other than low pass and high pass filters may exist or be developed that also perform this splitting function. The structure and nature of the various splitter circuits or components form no part of the present invention other than the fact that they "split" the combined signal and must be interconnected into an xDSL network in some manner at the customer end of the network.

Splitters have typically been housed with the xDSL modems. However, in view of the requirement for a demarcation point for at least the POTS signal at the network interface device (NID) at the subscriber, some architectural issues arise on how to accommodate the xDSL signal in the existing subscriber interface architecture. U.S. Pat. Nos. 4,488,008; 4,741,032; 5,355,408; and 5,414,765 show various examples of NIDs in use today where POTS modules that have a demarcation point are removably mounted in the NID.

A splitter sold by Alcatel under the designation "A1000 ADSL Remote Splitter" is disclosed as being installed in a NID, however, the Alcatel product suffers from potential drawbacks. First, the installation of the Alcatel splitter requires that the inside wiring be disconnected from the subscriber terminals of one of the POTS modules mounted in the NID and connected to the splitter. Then wires from the splitter are installed to the subscriber terminals on the POTS module. This removal of wiring and rewiring can be a cumbersome process and significantly increases the potential for a wiring mistake on installation. This is especially so considering that POTS modules were designed with a demarcation point that eliminated the need for the subscriber to disconnect any terminal wiring. Secondly, the Alcatel splitter does not provide a separate demarcation point for the POTS-only signal or for the xDSL-only signal. Because the splitter is placed between the demarcation point and the inside wiring, the combined signal passes through the demarcation point (the RJ-11 jack and plug) thereby preventing the ability to have a demarcation point for each isolated signal. Also, the Alcatel splitter takes up four line module spaces in a six line NID. This eliminates its use in NIDs of less than 5 lines or NIDs without four consecutive line module spaces available. Additionally, the Alcatel splitter mounts to an adapter plate that flexes a mounting tang with a projection in the NID as it is snapped into place in the NID by the customer with the telco door closed. Flexing of the mounting tang with the telco door closed is not the intended manner of use of the mounting tang which is meant to flexibly receive POTS modules therein with the telco door open. While insertion is possible while the telco door is closed due to the ramping on the top of the projection on the mounting tang, removal of the adapter plate is not practical without opening the telco door because the tang cannot be readily flexed to clear the projection from the adapter plate. As with the POTS module, ready removal of the adapter plate from the NID requires flexing of the tang that can only be sufficiently flexed when the telco door is open. Because customers do not have the authority to open the telco door, a customer will not be able to practically remove the Alcatel splitter adapter from the NID and may need to place a service call to remove the splitter adapter.

Accordingly, a need exists for an xDSL splitter module for use in the NID that overcomes one or more of the above discussed drawbacks.

SUMMARY OF THE INVENTION

The present invention provides an improved apparatus for accommodating the xDSL splitter in the existing Network Interface Devices (NIDs). One aspect of the present invention provides a splitter module for mounting in a network interface device (NID) for providing a demarcation point between a pair of outside plant wires and a first and a second pair of subscriber inside wires. The first pair of inside wires is for carrying a POTS signal, the second pair of inside wires is for carrying an xDSL signal and the pair of outside plant wires is for carrying a combined POTS and xDSL signal. The NID has a housing defining an accessible interior. The splitter module comprises a block of a size suitable for placement in the interior of the NID and an xDSL splitter circuit housed in the block with a first pair of contacts for electrical connection to the pair of outside plant wires and a second pair of contacts. A first circuit component of the circuit is electrically between the first and the second pair of contacts and designed to pass only POTS signals from the first pair of contacts to the second pair of contacts. A first inside pair of terminals is located on the block, electrically connected to the second pair of contacts, and configured for having the first pair of inside wires connected thereto. A second inside pair of terminals is located on the block, electrically connected to the outside pair of terminals so as to receive at least the xDSL signal, and configured for having the second pair of inside wires connected thereto. A POTS jack is connected to the block and capable of receiving a plug from a standard telephone. The POTS jack is electrically connectable to the second pair of contacts to allow for testing of the POTS signal by the subscriber by inserting a telephone plug from a telephone into the POTS jack when the POTS jack is electrically connected to the second pair of contacts.

Another aspect of the present invention is the combination of the splitter module with the NID. In a more particular aspect, the NID has a plurality of identical mounting locations and the splitter module has a footprint for removable attachment to one or more of the mounting locations. The splitter module is constructed such that other line modules can be located in adjacent mounting locations without interfering with the splitter module.

DETAILED DESCRIPTION OF THE PREFERRED EMBODIMENT

Figure 1:
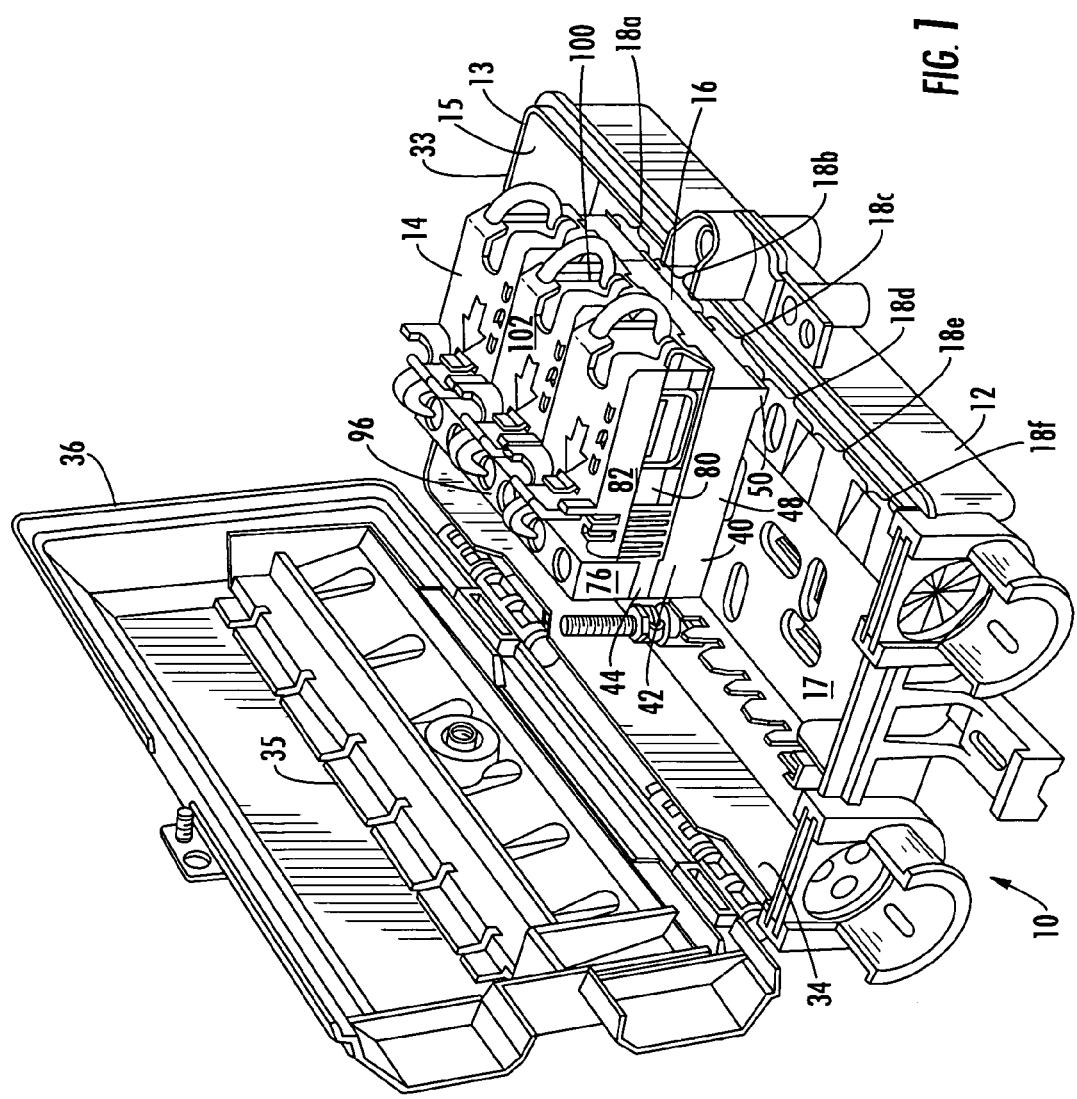
FIG. 1 is a perspective view of a NID with the preferred embodiment of the splitter module of the present invention mounted therein.
Figure 2:
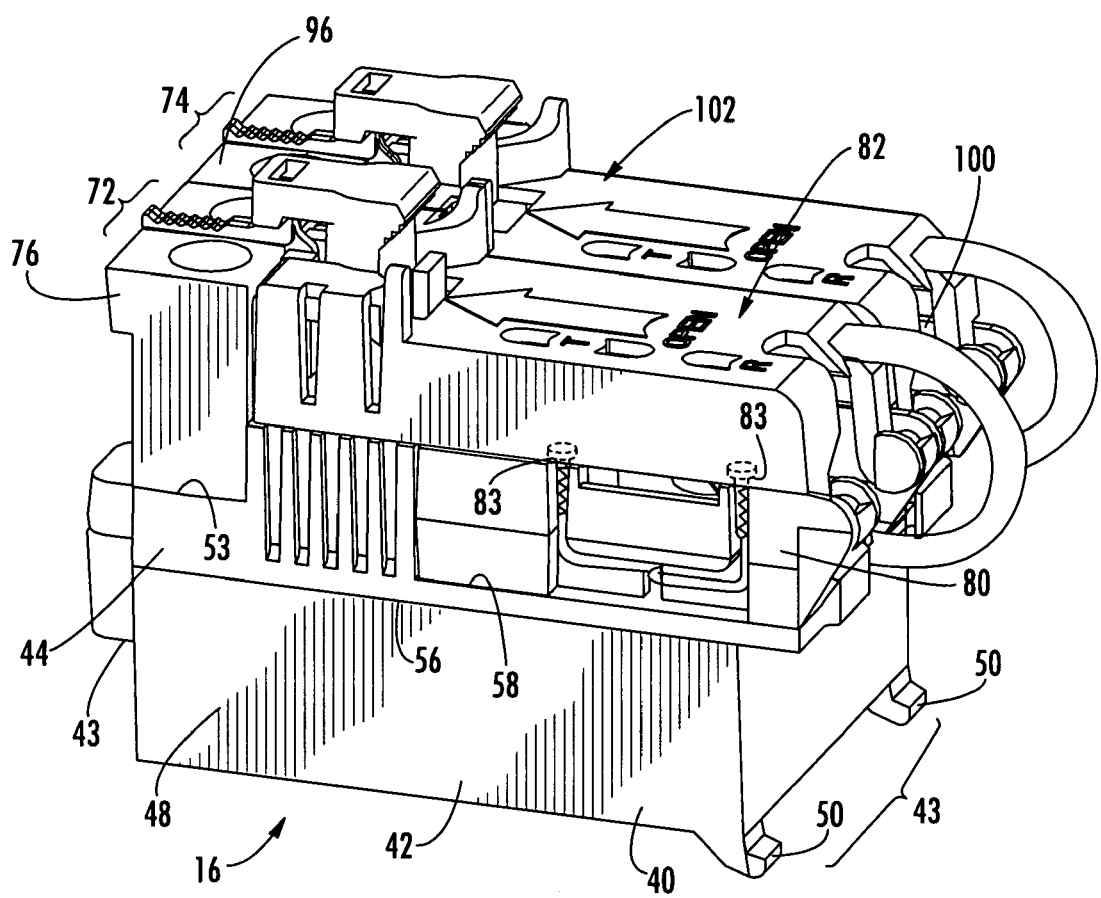
FIG. 2 is a perspective view of the preferred embodiment of the splitter module of the present invention.

With reference to FIGS. 1–6, the preferred embodiment of various aspects of the present invention are shown. With reference to FIG. 1, one arrangement of xDSL splitter assembly 10 is shown. Assembly 10 comprises network interface device (NID) 12 with POTS line module 14 and splitter module 16 mounted therein. In the arrangement depicted, line module 14 is a conventional line module that provides a demarcation point between one of the subscriber's phone lines and the telephone company's outside plant lines. If the customer only has one POTS line then POTS module 14 would not be needed with xDSL service. POTS module 14 is included in this arrangement to illustrate that additional POTS modules can be used alongside splitter module 16 of the present invention. NID 12 has mounting surface 17 in interior 15 and has a plurality of mounting locations 18a–f of the same configuration for removably retaining one or more modules mounted thereto.

NID 12 and line module 14 in FIG. 1 are a PTD NID and PTD POTS module, respectively, available from Siecor Corporation. The structure of the PTD NID and the POTS module as well as the mounting of the POTS modules to the mounting locations is disclosed in various U.S. Patents including U.S. Pat. Nos. 5,153,910; 5,333,193; 5,416,837; 5,479,505; 5,548,641 and other related patents (collectively, the PTD patents). These patents are incorporated herein by reference. Other commonly used NIDs and POTS modules include the Siecor 7600 NID and the Keptel SNI 4600. These NIDs also have a plurality of identical mounting locations for removably receiving one or more POTS modules mounted therein.

The wiring of these various NIDs to provide a point of demarcation for a POTS signal between outside plant wiring and the subscriber's inside wiring is well known. With respect to the PTD NID, the PTD POTS module contains the protector element and as such is distinguished from the other commonly used POTS modules that are wired to separate station protectors on the telephone compartment side of the NID. Because the PTD POTS module contains the protector, it will most likely always be telephone company owned even though the customer must have access to the door on the top of the POTS module to access the RJ-11 test jack. Providing this access while preventing customer removal of the POTS module is also disclosed in the PTD patents.

NID 12 has housing 13 with interior 15 that is divided into customer compartment 33 and telephone compartment 34. Inner door 35 closes over telephone compartment 34 and prevents removal of POTS module 14 and splitter module 16 from NID 12. Outer door 36 closes over inner door 35 and customer compartment 33 onto housing 13, and the customer is able to open outer door 36 to access customer compartment 33. The other commonly used NIDs have other door arrangements to similarly prevent removal of a POTS module from the NID while still providing access to the test jack on the POTS module.

Splitter module 16 of the present invention comprises block 40 which has base 42 which has a width of two adjacent mounting locations and has mounting footprint 43 configured for removable attachment to two mounting locations 18. FIG. 1 shows splitter module removably attached at mounting locations 18b–c. Base 42 has walls 48 and is similar to the base of the PTD patents except for the fact that it is the width of two mounting locations and has tabs 50 spaced to properly engage across two mounting locations 18 in NID 12. Walls 48 define cavity 52 (see cut away in FIG. 3) in base 42. Base 42 is preferably two mounting locations wide to provide sufficient space to house the xDSL splitter circuit components. However, it should be understood that as component sizes may decrease or are arranged in a more space saving manner, base 42 may be only one mounting location in width. Conversely, base 42 may be more than two mounting locations in width should additional or different components require more space.

Figure 3:
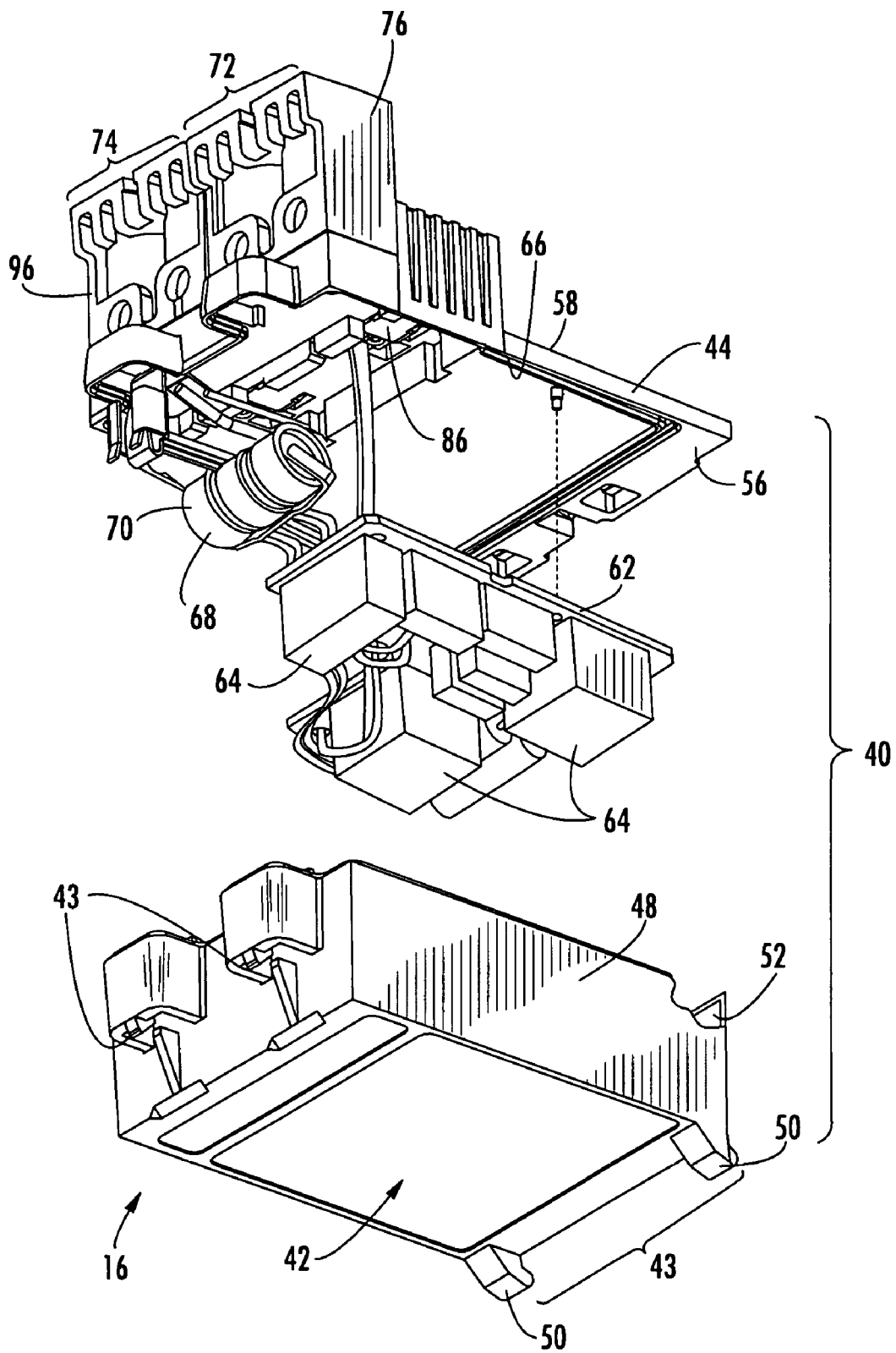
FIG. 3 is an exploded perspective view of the module of FIG. 2.
Figure 4:
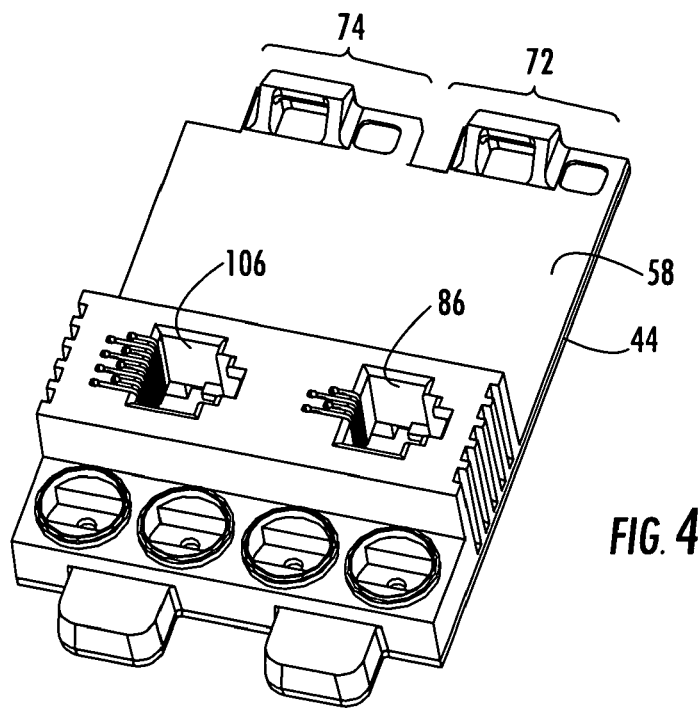
FIG. 4 is a perspective view of the carrier plate used in the module of FIG. 2.

Block 40 has carrier plate 44 mounted over base 42. Carrier plate 44 is generally planar with bottom side 56 facing toward base 42 and top side 58 facing opposite thereto. Carried on bottom side 56 is circuit board 62 which has various splitter components 64 thereon. Also carried on bottom side 56 is protector element 68 which is shown in FIG. 3 as gas tube 70. Welding ridge 66 extends around the periphery of bottom side 56 of carrier plate 44 to seal between carrier plate 44 and base 42 when ultrasonically welded. When carrier plate 44 is attached to base 42, splitter components 64 and protector element 68 extend into cavity 52 of base 42.

Top side 58 of carrier plate 44 is divided into POTS section 72 and xDSL section 74. POTS section 72 carries first terminal block 76 which appears like the terminal block of the PTD patents but does not contain any terminals. It is included to at least provide structure for the optional locking of first pivoting door 82 of first subscriber bridge 80 as disclosed in the PTD patents. First subscriber bridge 80 has terminals 83 for connection of a first pair of inside subscriber wiring 32, for example the subscriber's inside POTS wiring. First subscriber bridge 80 and first pivoting door 82 are like the subscriber bridge and pivoting door of the PTD patents. First pivoting door 82 has first plug 84, preferably an RJ-11 plug, which inserts into first jack 86, preferably an RJ-11 jack, when first door 82 is closed. First plug 84 and first jack 86 provide first demarcation point 85 for a first signal, for example the POTS signal. POTS section 72 is like the top of the line module of the PTD patents with one exception being that the terminal block 76 does not have terminals for connection of the telephone company outside plant wires.

xDSL section 74 carries second terminal block 96 which has first terminals 98, for example outside plant terminals shown as insulation displacement connectors (IDCs) 97, for connection of the telephone company outside plant wires as is disclosed in the PTD patents. xDSL section 74 has second subscriber bridge 100 with second pivoting door 102 as disclosed in the PTD patents. Second subscriber bridge 100 has terminals 103 for connection of a second pair of inside subscriber wiring 28, for example the subscriber's inside xDSL wiring. Second subscriber bridge 100 and second pivoting door 102 are like the subscriber bridge and pivoting door of the PTD patents with at least the exception that the wiring is preferably for xDSL. Second pivoting door 102 has second plug 104, preferably an RJ-45 plug, which inserts into second jack 106, preferably an RJ-45 jack, when second door 102 is closed. Second plug 104 and second jack 106 provide second demarcation point 105 for a second signal, for example, the xDSL signal, or for the combined signal depending on the type of splitter circuit. xDSL section 74 is like the top of the line module of the PTD patents with at least one exception being that the plug and jack are preferably intended for the xDSL signal. While RJ-11 and RJ-45 plugs and jacks are preferred due to their ease of use by subscribers, sections 72 and 74 can be implemented with any matable/rematable connector type suitable for use in telecommunications applications.

Figure 5:
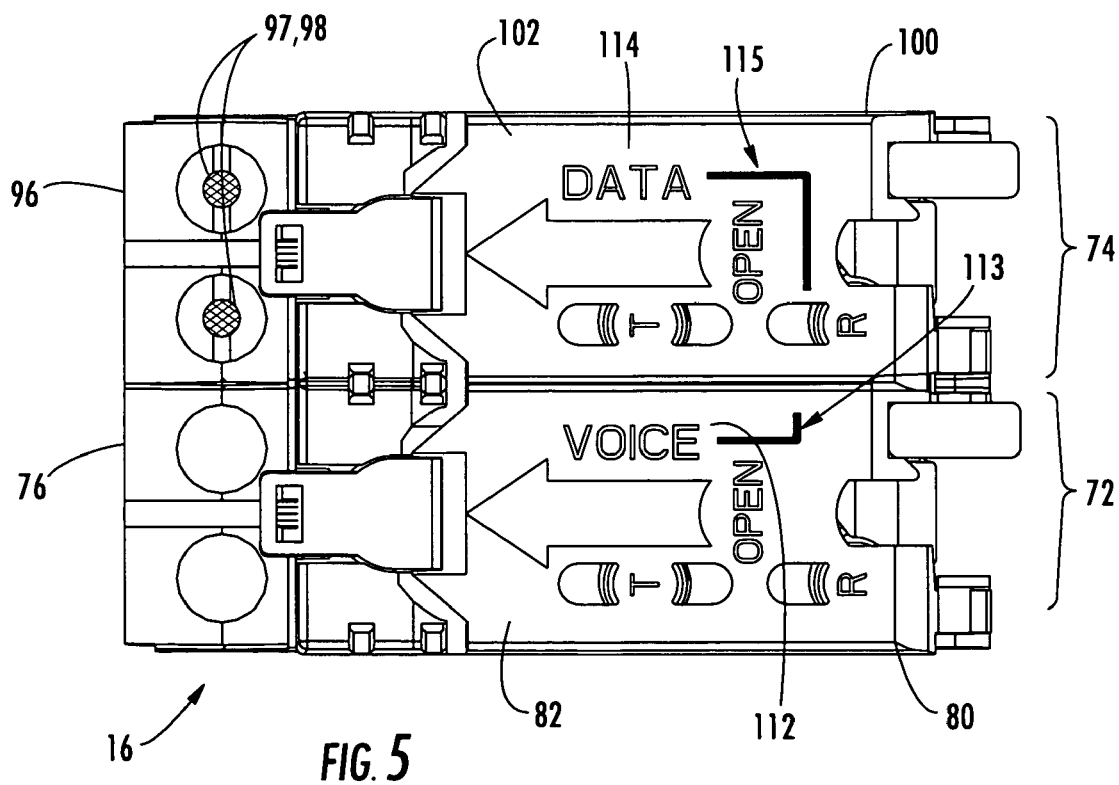
FIG. 5 is a top view of the module of FIG. 2.

With reference to FIG. 5, first door 82 is labeled with first indicia 112, for example "VOICE", and second door 102 is labeled with second indicia 114, for example "DATA", so that the subscriber can distinguish between the POTS demarcation point 85 and the xDSL demarcation point 105. Indicia 113 and 115 readily identify the "DATA" and "VOICE" wire pairs of a particular splitter module in the event multiple splitter modules are mounted adjacent to each other or with conventional line modules.

Figure 6:
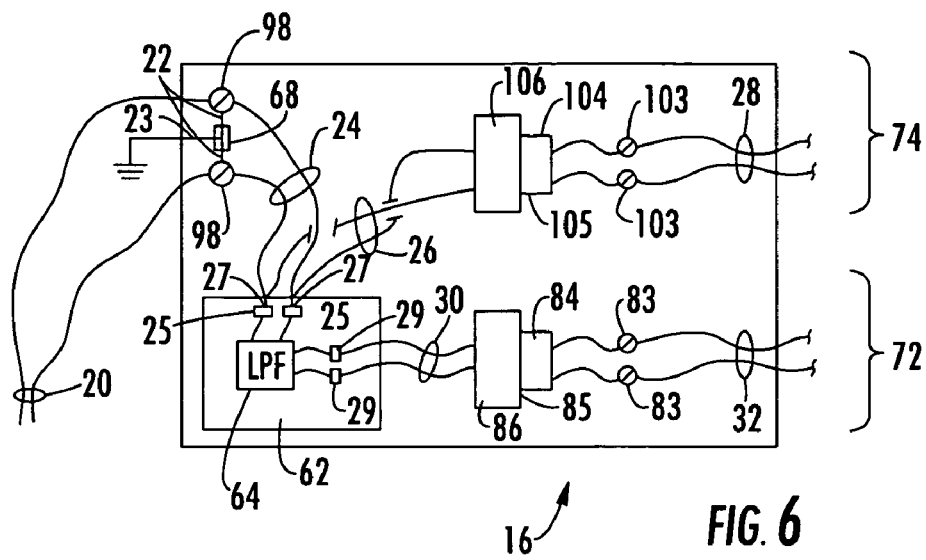
FIG. 6 is a wiring diagram of the preferred embodiment of the splitter module of the present invention.

With reference to FIG. 6, the preferred wiring diagram for splitter module 16 is shown. Telephone company outside plant wire pair 20 is connected to first terminals 98. Leads 22 connect terminals 98 to protector element 68 which shorts to ground 23 to protect the subscriber equipment when certain levels of surge occur. Leads 24 connect terminals 98 to first pair of contacts 25 on circuit board 62 which has first splitter circuit component 64 which may be a low pass filter. If there is to be no high pass filter to isolate the second signal, leads 26 electrically connect second jack 106 to a signal branch point 27 between terminals 98 and first splitter circuit component 64. Signal branch point 27 may also be at terminals 98 themselves. Second plug 104 is removably inserted in second jack 106 and is connected to terminals 103 which are connected to the second pair of subscriber inside wiring 28. Only the first signal, e.g. POTS, passes through splitter component 64 to second pair of contacts 29 which is connected to first jack 86 by leads 30 which is connected to first plug 84 which is connected to terminals 83 which are connected to first pair of subscriber inside wiring 32. It should be understood that the nature of the various terminals, leads, connections and components in FIG. 6 may be readily varied and still achieve the basic connection of the splitter and provide the appropriate demarcation points on the splitter module.

For installation of splitter module 16 when a new NID is being installed at a subscriber, splitter module 16 is simply plugged into the NID as is done with the traditional single wide POTS module 14. The outside plant wires are terminated at second terminal block 96, inside POTS wiring is terminated at terminals 83 of first subscriber bridge, and inside xDSL wiring is terminated at terminals 103 of second subscriber bridge 100.

Figure 7:
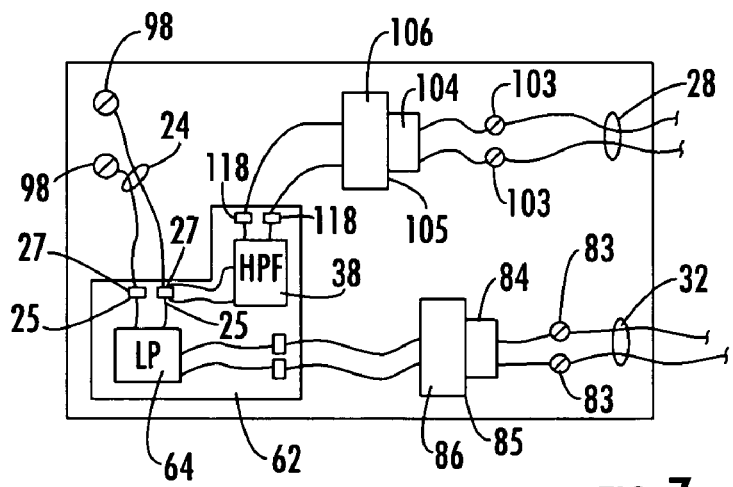
FIG. 7 is an alternative wiring diagram for a splitter module of the present invention.

FIG. 7 shows an alternative wiring diagram that incorporates second splitter circuit component 38, for example a high pass filter, placed in series between the signal branch point 27 and second jack 106 so as to pass only the second signal to inside wiring pair 28. Whether a circuit component such as second component 38 is included to pass only the xDSL signal depends on a particular application. Some applications locate such a component at the xDSL modem which may obviate the need for a high pass filter in splitter module 16. Another example of second component 38 may be a pair of DC blocking capacitors which has been proposed as a substitute for a high pass filter.

Figure 8:
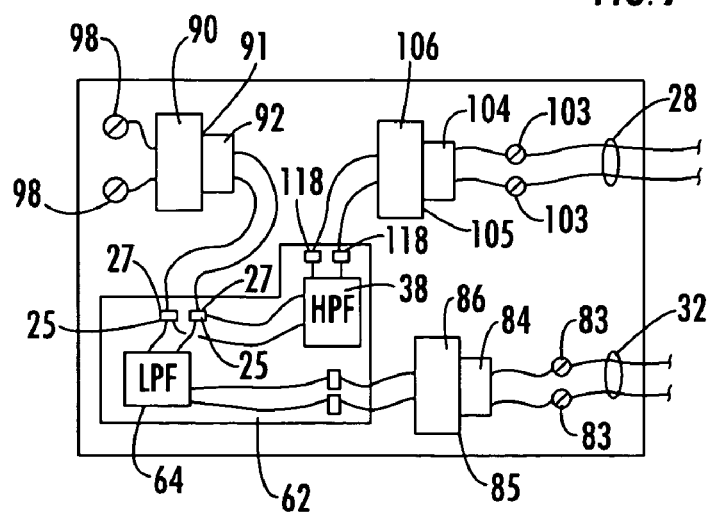
FIG. 8 is another alternative wiring diagram for a splitter module of the present invention.

FIG. 8 shows an alternative wiring diagram that incorporates combined signal demarcation jack 90 and plug 92 to create combined demarcation point 91 in addition to the POTS demarcation point 85 and the xDSL demarcation point 105. Combined jack 90 has combined plug 92 removably inserted therein and the connection is located electrically in series between terminals 98 and the signal branch point 27. The combined signal demarcation point 91 is useful to disconnect both pairs of inside wiring from the outside plant for safety reasons. Also, it is possible to test the combined signal, the POTS signal and the xDSL signal. By having a test point on each side of the splitter components, it is possible determine if the splitter circuit of splitter module 16 has malfunctioned. In the embodiment of FIG. 8, if a high pass filter is not used, the xDSL demarcation point 105 may be eliminated. Another alternative is to have combined demarcation 91 only—eliminating demarcations 85 and 105.

Although the present invention has been described with respect to a preferred embodiment, it should be understood that various changes, substitutions and modifications may be suggested to one skilled in the art and its is intended that the present invention encompass such changes, substitutions and modifications as fall within the scope of the appended claims.

What is claimed is:

1. A splitter module for mounting in a Network Interface Device (NID) for providing a demarcation point between a pair of outside plant wires and a first and a second pair of inside wires, the first pair of inside wires for carrying a first signal, the second pair of inside wires for carrying a second signal and the pair of outside wires for carrying a combined signal of the first and the second signals, the NID having a housing defining an accessible interior and having a mounting surface therein defining a plurality of mounting locations, the splitter module comprising:

(a) a block having a mounting footprint configured for removable attachment to at least one of the mounting locations;

(b) an outside plant pair of terminals located on the block and configured for having the pair of outside plant wires connected thereto;

(c) a splitter circuit housed in the block with a first pair of contacts electrically connected to the outside plant pair of terminals and a second pair of contacts, a first circuit component of the circuit electrically between the first and the second pair of contacts and designed to pass only the first signal from the first pair of contacts to the second pair of contacts;

(d) a first jack located on the block and electrically connected to the second pair of contacts;

(e) a first plug removably located in the first jack to provide a first demarcation point for the first signal;

(f) a first inside pair of terminals located on the block, electrically connected to the second pair of contacts through the first demarcation point and configured for having the first pair of inside wires connected thereto;

(g) a second inside pair of terminals located on the block, electrically connected to the outside plant pair of terminals so as to receive at least the second signal and configured for having the second pair of inside wires connected thereto;

(h) a second jack located on the block and electrically connected in series between the outside plant pair of terminals and the second inside pair of terminals; and (i) a second plug removably located in the second jack to provide a second demarcation point for the second signal.

2. The module of claim 1 wherein the block is of a size to occupy two mounting locations and allow other modules to be placed in adjacent mounting locations.

3. The module of claim 1 wherein the splitter circuit further comprises a third pair of contacts and a second circuit component located electrically between the first pair of contacts and the third pair of contacts and designed to pass only the second signal from the first pair of contacts to the third pair of contacts.

4. The module of claim 1 further comprising a combined signal jack located electrically in series between the outside plant pair of terminals and the first pair of contacts to provide a third demarcation point for the combined signal.

5. The module of claim 1 further comprising a protector located in the block for conducting surges to ground.

6. A splitter module for mounting in a Network Interface Device (NID) for providing a demarcation point between a pair of outside plant wires and a first and a second pair of inside wires, the first pair of inside wires for carrying a first signal, the second pair of inside wires for carrying a second signal and the pair of outside wires for carrying a combined signal of the first and the second signals, the NID having a housing defining an accessible interior, the splitter module comprising:

(a) a block of a size suitable for placement in the interior of the NID;

(b) a splitter circuit housed in the block with a first pair of contacts for electrical connection to the pair of outside plant wires and a second pair of contacts, a first circuit component of the circuit electrically between the first and the second pair of contacts and designed to pass only the first signal from the first pair of contacts to the second pair of contacts;

(c) a first inside pair of terminals located on the block electrically connected to the second pair of contacts and configured for having the first pair of inside wires connected thereto;

(d) a second inside pair of terminals located on the block, electrically connected to the pair of outside plant wires so as to receive at least the second signal and configured for having the second pair of inside wires connected thereto;

(e) a POTS jack connected to the block and configured to receive a first plug, the POTS jack electrically connectable to the second pair of contacts for testing the first signal by inserting the first plug into the POTS jack when the POTS jack is electrically connected to the second pair of contacts; and (f) a second jack connected to the block and configured to receive a second plug, the second jack electrically connectable in series between the first pair of contacts and the second inside pair of terminals for testing the second signal by inserting the second plug into the second jack when the second jack is electrically connected to the second inside pair of terminals.

7. The module of claim 6 wherein the splitter circuit further comprises a third pair of contacts and a second circuit component located electrically between the first pair of contacts and the third pair of contacts and designed to pass only the second signal from the first pair of contacts to the third pair of contacts.

8. The module of claim 6 further comprising a combined signal jack located electrically in series between the pair of outside plant wires and the first pair of contacts for testing the combined signal.

9. The module of claim 6 wherein the POTS jack is electrically connected to the second pair of contacts during normal operation.

10. The module of claim 6 wherein the NID has a plurality of mounting locations and the block defines a mounting footprint that is removably attachable to at least one of the mounting locations.

11. An xDSL splitter assembly, comprising (a) a network interface device (NID) for providing a demarcation point between a pair of outside plant wires and a first and a second pair of inside wires, the first pair of inside wires for carrying a POTS signal, the second pair of inside wires for carrying an xDSL signal and the pair of outside plant wires for carrying a combined POTS and xDSL signal, the NID having a housing defining an interior with a plurality of mounting locations; and (b) a splitter module comprising:

(i) a block with a mounting footprint to be received in at least one of the mounting locations;

(ii) an xDSL splitter circuit housed in the block with a first pair of contacts for electrical connection to the pair of outside plant wires and a second pair of contacts, a first circuit component of the circuit electrically between the first and the second pair of contacts and designed to pass only POTS signals from the first pair of contacts to the second pair of contacts;

(iii) a first inside pair of terminals located on the block electrically connected to the second pair of contacts and configured for having the first pair of inside wires connected thereto;

(iv) a second inside pair of terminals located on the block electrically connected to the pair of outside plant wires so as to receive at least the xDSL signal and configured for having the second pair of inside wires connected thereto;

(v) a POTS jack connected to the block and configured to receive a first plug, the POTS jack electrically connectable to the second pair of contacts for testing the POTS signal by inserting the first plug into the POTS jack when the POTS jack is electrically connected to the second pair of contacts; and (vi) an xDSL jack connected to the block and configured to receive a second plug, the xDSL jack electrically connectable in series between the first pair of contacts and the second inside pair of terminals for testing the xDSL signal by inserting the second plug into the xDSL jack when the xDSL jack is electrically connected to the second inside pair of terminals.

12. The assembly of claim 11 further comprising at least one POTS line module mounted at a mounting location adjacent to the splitter module.

13. The assembly of claim 11 wherein the NID further comprises an inner door that prevents unauthorized removal of the splitter module from its mounting location when in a closed position.

14. A splitter module for selectively passing a first signal from a combined signal having the first signal together with a second signal, the splitter module comprising:

(a) a housing;

(b) a first pair of terminals located on the housing;

(c) an RJ-11 jack located on the housing and an RJ-11 plug removably inserted in the RJ-11 jack to create a first demarcation point;

(d) a first splitter circuit located in the housing and electrically in series between the first pair of terminals and the RJ-11 jack, the first splitter circuit designed to pass only the first signal to the RJ-11 jack when the combined signal is transmitted through the first pair of terminals to the first splitter circuit; and (e) an RJ-45 jack located on the housing and an RJ-45 plug removably inserted in the RJ-45 jack to create a second demarcation point, the RJ-45 jack electrically connected to a point between the first pair of terminals and the first splitter circuit.

15. The splitter module of claim 14 further comprising a second splitter circuit located in the housing and electrically in series between the point and the RJ-45 jack, the second splitter circuit designed to pass only the second signal to the RJ-45 jack when the combined signal is transmitted through the first pair of terminals to the second splitter circuit.

* * * * *